United States Patent
Etcheson

(10) Patent No.: US 7,804,426 B2
(45) Date of Patent: Sep. 28, 2010

(54) SYSTEM AND METHOD FOR SELECTIVE REVIEW OF EVENT DATA

(75) Inventor: Jamie Etcheson, El Cajon, CA (US)

(73) Assignee: DriveCam, Inc., San Diego, CA (US)

( * ) Notice: Subject to any disclaimer, the term of this patent is extended or adjusted under 35 U.S.C. 154(b) by 747 days.

(21) Appl. No.: 11/566,424

(22) Filed: Dec. 4, 2006

(65) Prior Publication Data

US 2007/0260361 A1 Nov. 8, 2007

Related U.S. Application Data

(63) Continuation-in-part of application No. 11/382,328, filed on May 9, 2006, and a continuation-in-part of application No. 11/382,325, filed on May 9, 2006, and a continuation-in-part of application No. 11/382,239, filed on May 8, 2006, now abandoned, and a continuation-in-part of application No. 11/382,222, filed on May 8, 2006.

(51) Int. Cl.
   *G08G 1/017* (2006.01)
(52) U.S. Cl. .......................... 340/937; 348/148; 701/35
(58) Field of Classification Search .................. 701/35; 340/439, 576, 937; 348/148; 702/188; 709/219; 725/86, 91, 93, 94, 143–146
   See application file for complete search history.

(56) References Cited

U.S. PATENT DOCUMENTS 2,943,141 A 6/1960 Knight
3,781,824 A 12/1973 Caiati et al.
3,812,287 A 5/1974 Lemelson
3,885,090 A 5/1975 Rosenbaum
3,992,656 A 11/1976 Joy
4,054,752 A 10/1977 Dennis, Jr. et al.

(Continued)

FOREIGN PATENT DOCUMENTS

GB 2 268 608 1/1994

(Continued)

OTHER PUBLICATIONS

International Search Report and Written Opinion issued in PCT/US07/68329 on Mar. 3, 2008.

*Primary Examiner*—Thomas J Mullen
(74) *Attorney, Agent, or Firm*—Steins & Associates, P.C.

(57) ABSTRACT

Systems and methods for computer assisted cueing and selective reviewing of driving data in order to save time in the data review process are provided. The method allows identifying essential portions of the data, selecting the essential portions, reviewing the selected data and retrieving additional data leading to the event if necessary. At least one event capture device continuously captures data into a buffer. The data are sent to an event detector communicatively coupled to the event capture device only when the event detector requests them. After receiving the data, the event detector selects and indexes a pre-event portion, during-event portion and post-event portion, combines the portions of captured data into a single driving event record and sends the driving event record to the evaluation server. From the server, the driving event record is sent to the analysis station for review and analysis.

33 Claims, 8 Drawing Sheets

U.S. PATENT DOCUMENTS

| | | |
|---|---|---|
| 4,271,358 A | 6/1981 | Schwarz |
| 4,280,151 A | 7/1981 | Tsunekawa et al. |
| 4,281,354 A | 7/1981 | Conte |
| 4,401,976 A | 8/1983 | Stadelmayr |
| 4,409,670 A | 10/1983 | Herndon et al. |
| 4,420,773 A | 12/1983 | Toyoda et al. |
| 4,456,931 A | 6/1984 | Toyoda et al. |
| 4,489,351 A | 12/1984 | d'Alayer de Costemore d'Arc |
| 4,496,995 A | 1/1985 | Colles et al. |
| 4,533,962 A | 8/1985 | Decker et al. |
| 4,558,379 A | 12/1985 | Hutter et al. |
| 4,593,313 A | 6/1986 | Nagasaki et al. |
| 4,621,335 A | 11/1986 | Bluish et al. |
| 4,625,210 A | 11/1986 | Sagl |
| 4,630,110 A | 12/1986 | Cotton et al. |
| 4,632,348 A | 12/1986 | Keesling et al. |
| 4,638,289 A | 1/1987 | Zottnik |
| 4,646,241 A | 2/1987 | Ratchford et al. |
| 4,651,143 A | 3/1987 | Yamanaka |
| 4,758,888 A | 7/1988 | Lapidot |
| 4,763,745 A | 8/1988 | Eto et al. |
| 4,785,474 A | 11/1988 | Bernstein et al. |
| 4,789,904 A | 12/1988 | Peterson |
| 4,794,566 A | 12/1988 | Richards et al. |
| 4,804,937 A | 2/1989 | Barbiaux et al. |
| 4,806,931 A | 2/1989 | Nelson |
| 4,837,628 A | 6/1989 | Sasaki |
| 4,839,631 A | 6/1989 | Tsuji |
| 4,843,463 A | 6/1989 | Michetti |
| 4,843,578 A | 6/1989 | Wade |
| 4,876,597 A | 10/1989 | Roy et al. |
| 4,883,349 A | 11/1989 | Mittelhauser |
| 4,896,855 A | 1/1990 | Furnish |
| 4,930,742 A | 6/1990 | Schofield et al. |
| 4,936,533 A | 6/1990 | Adams et al. |
| 4,939,652 A | 7/1990 | Steiner |
| 4,942,464 A | 7/1990 | Milatz |
| 4,945,244 A | 7/1990 | Castleman |
| 4,949,186 A | 8/1990 | Peterson |
| 4,980,913 A | 12/1990 | Skret |
| 4,987,541 A | 1/1991 | Levente et al. |
| 4,992,943 A | 2/1991 | McCracken |
| 5,012,335 A | 4/1991 | Cohodar |
| 5,027,104 A | 6/1991 | Reid |
| 5,056,056 A | 10/1991 | Gustin |
| 5,057,820 A | 10/1991 | Markson et al. |
| 5,096,287 A | 3/1992 | Kakinami et al. |
| 5,100,095 A | 3/1992 | Haan et al. |
| 5,111,289 A | 5/1992 | Lucas et al. |
| 5,140,434 A | 8/1992 | Van Blessinger et al. |
| 5,140,436 A | 8/1992 | Blessinger |
| 5,144,661 A | 9/1992 | Shamosh et al. |
| 5,178,448 A | 1/1993 | Adams et al. |
| 5,196,938 A | 3/1993 | Blessinger |
| 5,223,844 A | 6/1993 | Mansell et al. |
| 5,262,813 A | 11/1993 | Scharton |
| 5,308,247 A | 5/1994 | Dyrdek |
| 5,311,197 A | 5/1994 | Sorden et al. |
| 5,321,753 A | 6/1994 | Gritton |
| 5,327,288 A | 7/1994 | Wellington et al. |
| 5,330,149 A | 7/1994 | Haan et al. |
| 5,343,527 A | 8/1994 | Moore |
| 5,353,023 A | 10/1994 | Mitsugi |
| 5,361,326 A | 11/1994 | Aparicio, IV et al. |
| 5,387,926 A | 2/1995 | Bellan |
| 5,388,045 A | 2/1995 | Kamiya et al. |
| 5,404,330 A | 4/1995 | Lee et al. |
| 5,408,330 A | 4/1995 | Squicciarini et al. |
| 5,422,543 A | 6/1995 | Weinberg |
| 5,430,431 A | 7/1995 | Nelson |
| 5,430,432 A | 7/1995 | Camhi et al. |
| 5,435,184 A | 7/1995 | Pineroli et al. |
| 5,445,024 A | 8/1995 | Riley, Jr. et al. |
| 5,445,027 A | 8/1995 | Zorner |
| 5,446,659 A | 8/1995 | Yamawaki |
| 5,455,625 A | 10/1995 | Englander |
| 5,455,716 A | 10/1995 | Suman et al. |
| 5,473,729 A | 12/1995 | Bryant et al. |
| 5,477,141 A | 12/1995 | Nather et al. |
| 5,495,242 A | 2/1996 | Kick et al. |
| 5,497,419 A | 3/1996 | Hill |
| 5,499,182 A | 3/1996 | Ousborne |
| 5,504,482 A | 4/1996 | Schreder |
| 5,515,285 A | 5/1996 | Garret, Sr. et al. |
| 5,521,633 A | 5/1996 | Nakajima et al. |
| 5,523,811 A | 6/1996 | Wada et al. |
| 5,526,269 A | 6/1996 | Ishibashi et al. |
| 5,530,420 A | 6/1996 | Tsuchiya et al. |
| 5,537,156 A | 7/1996 | Katayama |
| 5,539,454 A | 7/1996 | Williams |
| 5,541,590 A | 7/1996 | Nishio |
| 5,544,060 A | 8/1996 | Fujii et al. |
| 5,548,273 A | 8/1996 | Nicol et al. |
| 5,552,990 A | 9/1996 | Ihara et al. |
| 5,559,496 A | 9/1996 | Dubats |
| 5,568,211 A | 10/1996 | Bamford |
| 5,570,127 A | 10/1996 | Schmidt |
| 5,574,443 A | 11/1996 | Hsieh |
| D376,571 S | 12/1996 | Kokat |
| 5,581,464 A | 12/1996 | Woll et al. |
| 5,590,948 A | 1/1997 | Moreno |
| 5,596,382 A | 1/1997 | Bamford |
| 5,610,580 A | 3/1997 | Lai |
| 5,612,686 A | 3/1997 | Takano et al. |
| 5,631,638 A | 5/1997 | Kaspar et al. |
| 5,638,273 A | 6/1997 | Coiner et al. |
| 5,642,106 A | 6/1997 | Hancock et al. |
| 5,646,856 A | 7/1997 | Kaesser |
| 5,652,706 A | 7/1997 | Morimoto et al. |
| RE35,590 E | 8/1997 | Bezos et al. |
| 5,654,892 A | 8/1997 | Fujii et al. |
| 5,659,355 A | 8/1997 | Barron et al. |
| 5,667,176 A | 9/1997 | Zamarripa et al. |
| 5,669,698 A | 9/1997 | Veldman et al. |
| 5,671,451 A | 9/1997 | Takahashi et al. |
| 5,677,979 A | 10/1997 | Squicciarini et al. |
| 5,680,117 A | 10/1997 | Arai et al. |
| 5,680,123 A | 10/1997 | Lee |
| 5,689,442 A | 11/1997 | Swanson et al. |
| 5,696,705 A | 12/1997 | Zykan |
| 5,706,362 A | 1/1998 | Yabe |
| 5,712,679 A | 1/1998 | Coles |
| 5,717,456 A | 2/1998 | Rudt et al. |
| 5,719,554 A | 2/1998 | Gagnon |
| 5,784,521 A | 7/1998 | Nakatani et al. |
| 5,790,403 A | 8/1998 | Nakayama |
| 5,790,973 A | 8/1998 | Blaker et al. |
| 5,793,420 A | 8/1998 | Schmidt |
| 5,794,165 A | 8/1998 | Minowa et al. |
| 5,797,134 A | 8/1998 | McMillian et al. |
| 5,798,458 A | 8/1998 | Monroe |
| 5,800,040 A | 9/1998 | Santo |
| 5,802,545 A | 9/1998 | Coverdill |
| 5,802,727 A | 9/1998 | Blank et al. |
| 5,815,093 A | 9/1998 | Kikinis |
| 5,825,412 A | 10/1998 | Hobson et al. |
| 5,844,505 A | 12/1998 | Van Ryzin |
| 5,896,167 A | 4/1999 | Omae et al. |
| 5,897,606 A | 4/1999 | Miura et al. |
| 5,899,956 A | 5/1999 | Chan |
| 5,901,806 A | 5/1999 | Takahashi |
| 5,914,748 A | 6/1999 | Parulski et al. |
| 5,926,210 A | 7/1999 | Hacket et al. |
| 5,946,404 A | 8/1999 | Bakshi et al. |

| | | | | | |
|---|---|---|---|---|---|
| 5,978,017 | A | 11/1999 | Tino | | |
| 6,002,326 | A | 12/1999 | Turner | | |
| 6,008,723 | A | 12/1999 | Yassan | | |
| 6,008,841 | A | 12/1999 | Charlson | | |
| 6,009,370 | A | 12/1999 | Minowa et al. | | |
| 6,011,492 | A | 1/2000 | Garesche | | |
| 6,028,528 | A | 2/2000 | Lorenzetti et al. | | |
| 6,037,860 | A | 3/2000 | Zander et al. | | |
| 6,037,977 | A | 3/2000 | Peterson | | |
| 6,064,792 | A | 5/2000 | Fox et al. | | |
| 6,092,193 | A | 7/2000 | Loomis et al. | | |
| 6,122,738 | A | 9/2000 | Millard | | |
| 6,141,611 | A | 10/2000 | Mackey et al. | | |
| 6,144,296 | A | 11/2000 | Ishida et al. | | |
| 6,151,065 | A | 11/2000 | Steed et al. | | |
| 6,163,338 | A | 12/2000 | Johnson et al. | | |
| 6,167,186 | A | 12/2000 | Kawasaki et al. | | |
| 6,181,373 | B1 | 1/2001 | Coles | | |
| 6,185,490 | B1 | 2/2001 | Ferguson | | |
| 6,211,907 | B1 | 4/2001 | Seaman et al. | | |
| 6,218,960 | B1 | 4/2001 | Ishikawa et al. | | |
| 6,246,933 | B1 | 6/2001 | Bague | | |
| 6,253,129 | B1 | 6/2001 | Jenkins et al. | | |
| 7,100,190 | B2 | 8/2006 | Johnson et al. | | |
| 2003/0080878 | A1 | 5/2003 | Kirmuss | | |
| 2003/0125854 | A1* | 7/2003 | Kawasaki et al. | | 701/35 |
| 2003/0154009 | A1 | 8/2003 | Basir et al. | | |
| 2006/0092043 | A1 | 5/2006 | Lagassey | | |
| 2006/0242680 | A1 | 10/2006 | Johnson et al. | | |

FOREIGN PATENT DOCUMENTS

| | | |
|---|---|---|
| JP | 5-137144 | 6/1993 |
| JP | 5-294188 | 11/1993 |
| JP | 8-124069 | 5/1996 |
| JP | 10-076880 | 3/1998 |
| WO | WO 88/09023 | 11/1988 |
| WO | WO 90/05076 | 5/1990 |
| WO | WO 94/27844 | 12/1994 |
| WO | WO 96/00957 | 1/1996 |
| WO | WO 97/01246 | 1/1997 |
| WO | WO 99/37503 | 7/1999 |
| WO | WO 99/40545 | 8/1999 |
| WO | WO 99/62741 | 12/1999 |
| WO | WO 00/48033 | 8/2000 |
| WO | WO 00/77620 | 12/2000 |
| WO | WO 01/25054 | 4/2001 |

* cited by examiner

SYSTEM AND METHOD FOR SELECTIVE REVIEW OF EVENT DATA

RELATED APPLICATION

The present application is a continuation-in-part of co-pending U.S. patent application Ser. Nos. 11/382,222 and 11/382,239, filed May 8, 2006; and Ser. Nos. 11/382,325 and 11/382,328, filed May 9, 2006, of concurrent ownership, all of which are incorporated herein by reference in their entirety.

BACKGROUND

1. Field of the Invention

The present invention generally relates to reviewing of driving events and more specifically relates to capturing driving event data and selecting essential parts of the data for review.

2. Related Art

Typical systems for review of captured driving event data usually require reviewing of a significant amount of "raw" data. One of the problems with reviewing voluminous "raw" data is that it involves reviewing essential as well as non-essential data, and separating essential data from non-essential data (e.g. non-essential pre-event data, etc.). Both, the reviewing and separating of the data can be very time consuming. Since watching the non-essential pre-event data by an operator is usually a waste of time, the review process can be inefficient and time consuming.

Today, there is no system in place that can efficiently shorten the review process by helping to determine which portion of the captured data is essential, selecting the essential portion of data, cueing the selected data for review, and retrieving additional data leading to the event if it is necessary.

Accordingly, what is needed is an efficient system and method for selective cueing and reviewing of the driving event data that allow to index playback of the captured data just prior to the beginning of the essential event data so the non-essential data can be skipped during the review.

SUMMARY

Accordingly, systems and methods for computer assisted cueing and selective reviewing of event data to save time in the data review process are provided.

In one aspect, the system for selective review of event data comprises at least one event capture device, an event detector, an evaluation server and an analysis station. The event capture device continuously captures driving event data in a buffer. While capturing the data, the event capture device also checks the status of a trigger which can be set by the event detector to either "on" or "off." If the trigger is "on," the event capture device sends driving event data to the event detector continuously. If the trigger is "off," the event capture device only keeps capturing event data and filling the buffer, and writing over the previously captured data when the buffer is full.

In one aspect, when a driving event starts, an operator sends an event trigger to the event detector, or a detector configured to detect a driving event which potentially requires evaluation sends a trigger to the event detector. Upon receiving the trigger, the event detector passes the trigger to at least one event capture device. In response to the trigger, the event capture device sends data to the event detector.

In one aspect, the event detector collects three types of data: pre-event data, event data and post-event data. The event detector then indexes the beginning and end of the pre-event data, event data and post-event data.

In one aspect, the event detector combines the pre-event data, during-event data and post-event data into a single driving event and stores the events in the evaluation server. From the server, the data are sent to the analysis station where they are cued, reviewed and analyzed.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Certain embodiments as disclosed herein provide for systems and methods for computer assisted cueing and selective reviewing of driving data in order to save time in the review process. For example, the method for selective cueing and reviewing of the driving events allows an operator to select a part of the captured driving event data, review the data and, if it is needed, retrieve more data leading to the event.

In one embodiment, the system for selective reviewing of driving event data comprises an event detector coupled with a vehicle, an evaluation server, an analysis station and at least one event capture device. The event capture device captures driving event data and sends the data to the event detector upon receiving a request from the event detector. The event detector is configured to receive, index and store driving events. The events data are indexed using a pre-event time index, a trigger time index, and a post-event time index. The evaluation server receives driving events from the event detector, stores them and provides them to the analysis station where the data are cued, reviewed and analyzed.

In one embodiment, the analysis station comprises a data loading module, a data indexing module, a data control module, and a data playing module. The data loading module is configured to receive the driving event data from the evaluation server and load the data for review. The data indexing module is configured to cue up the driving event at a cue time set substantially close, but prior to the trigger time. The data playing module is configured to play the driving event from the cue time to the post-event time.

In one embodiment, the method for selective reviewing of driving event data comprises capturing and indexing a driving event at an event detector, sending the driving event from the event detector to an evaluation server, receiving and storing a plurality of driving events at the evaluation server, sending the driving event from the evaluation server to an analysis station, receiving the driving event at the analysis station and loading the driving event for review. Once the driving event data are cued, the data are played from the cue time to the end of the event data (indexed by the post-event time).

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1:
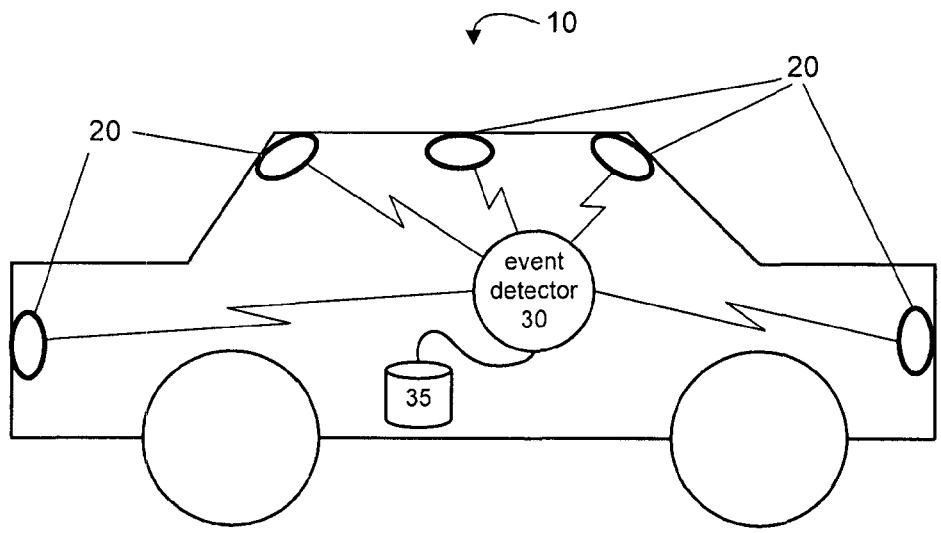
FIG. 1 is a block diagram illustrating an example event detector in control of a plurality of event capture devices deployed in a vehicle according to an embodiment of the present invention.

FIG. 1 is a block diagram illustrating an example event detector 30 in control of a plurality of event capture devices 20 deployed in a vehicle 10 according to an embodiment of the present invention. In the illustrated embodiment, the event detector 30 is integrated with the vehicle 10 and is communicatively coupled with the event capture devices 20. The event detector 30 is also configured with data storage 35.

The event detector 30 can be any of a variety of types of computing devices with the ability to execute programmed instructions, receive input from various sensors, and communicate with one or more internal or external event capture devices 20 and other external devices (not shown). An example of a general purpose computing device that may be employed as all or a portion of an event detector 30 is later described with respect to FIG. 10.

In one embodiment, the event detector 30 monitors its sensor to detect a driving event. When the event detector 30 detects a sensor output or trigger indicting the start of a driving event, the event detector 30 instructs one or more event capture devices 20 to send pre-event data, during the event data, and post-event data to the event detector 30. Then, the event detector 30 stores the data in the data storage area 35 as an event. Events may comprise a variety of situations, including automobile accidents, reckless driving, rough driving, or any other type of stationary or moving occurrence that the owner of a vehicle 10 may desire to know about.

The vehicle 10 may have a plurality of event capture devices 20 placed in various locations around the vehicle 10. An event capture device 20 may comprise a video camera, still camera, microphone, and other types of data capture devices. For example, an event capture device 20 may include an accelerometer that senses changes in speed or direction. Additional sensors and/or data capture devices may also be incorporated into an event capture device 20 in order to provide a rich set of information about a detected event.

The data storage area 35 can be any sort of internal or external, fixed or removable memory device and may include both persistent and volatile memories. The function of the data storage area 35 is to maintain data for long term storage and also to provide efficient and fast access to instructions, applications and/or modules that are executed by the event capture device 30.

In one embodiment, the event detector 30 in combination with the one or more event capture devices 20 identifies an event and stores certain audio and video data along with related information about the event. For example, related information may include the speed of the vehicle when the event occurred, the direction the vehicle was traveling, the location of the vehicle (e.g., from a global positioning system ("GPS") sensor), and other information from sensors located in and around the vehicle or from the vehicle itself (e.g., from a data bus integral to the vehicle such as a J-1850 vehicle bus). This combination of audio, video, and other data is compiled into one event. The event can be stored in data storage 35 onboard the vehicle for later delivery to an evaluation server.

Figure 2:
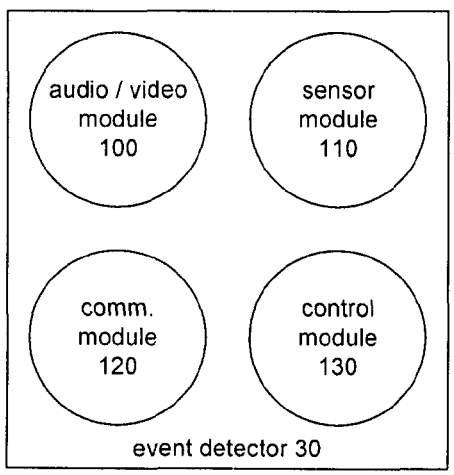
FIG. 2 is a block diagram illustrating an example event detector according to an embodiment of the present invention.

FIG. 2 is a block diagram illustrating an example event detector 30 according to an embodiment of the present invention. In the illustrated embodiment, the event detector 30 comprises an audio/video ("AV") module 100, a sensor module 110, a communication module 120, and a control module 130. Additional modules may also be employed to carry out the various functions of the event detector 30, as will be understood by those having skill in the art.

In one embodiment, the AV module 100 is configured to manage the audio and video input from one or more event capture devices and storage of the audio and video input. The sensor module 110 is configured to manage one or more sensors that can be integral to the event detector 30 or external from the event detector 30. For example, an accelerometer may be integral to the event detector 30 or it may be located elsewhere in the vehicle. The sensor module 110 may also manage other types of sensor devices such as a GPS sensor, temperature sensor, moisture sensor, or the like (all not shown).

The communication module 120 can be configured to manage communications between the event detector 30 and other devices and modules. For example, the communication module 120 may handle communications between the event detector 30 and the various event capture devices. The communication module 120 may also handle communications between the event detector 30 and a memory device, a docking station, or a server such as an evaluation server. The communication module 120 is configured to communicate with these various types of devices and other types of devices via a direct wire link (e.g., USB cable, firewire cable), a direct wireless link (e.g., infrared, Bluetooth), or a wired or wireless network link such as a local area network ("LAN"), a wide area network ("WAN"), a wireless wide area network ("WWAN"), or an IEEE 802 wireless network such as an IEEE 802.16 ("WiFi") network.

The control module 130 can be configured to control the actions or remote devices such as the one or more event capture devices. For example, the control module 130 may be configured to instruct the event capture devices to capture an event and return the data to the event detector when it is informed by the sensor module 110 that certain trigger criteria have been met that identify an event.

Figure 3:
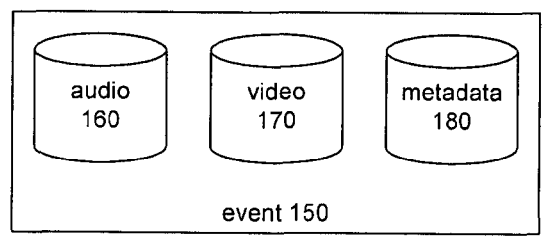
FIG. 3 is a block diagram illustrating an example event according to an embodiment of the present invention.

FIG. 3 is a block diagram illustrating an example event 150 according to an embodiment of the present invention. In the illustrated embodiment, the event 150 comprises audio data 160, video data 170, and metadata 180. Audio data 160 can be collected from inside the vehicle, outside the vehicle, and may include information from an internal vehicle bus about the baseline noise level of the operating vehicle, if such information is available. Additional information about baseline noise level, radio noise level, conversation noise level, or external noise level may also be included in audio data 160.

Video data 170 may include still images or moving video captured by one or more cameras in various locations in and around the vehicle. Video data 170 may include images or video from inside the vehicle, outside the vehicle, or both. In one particularly advantageous embodiment, still images and moving video that illustrate the entire area inside the vehicle and the entire 360 degree area surrounding the vehicle are captured by a plurality of image capture devices and included in video data 170.

Metadata 180 may include a variety of additional information that is available to the event detector at the time of an event. Such additional data may include the velocity and direction of the vehicle, the GPS location of the vehicle, elevation, time, temperature, and vehicle engine and electrical component information captured from an internal vehicle bus, just to name a few. Additional information may also be included such as the number of occupants in the vehicle, whether seatbelts were fastened, whether airbags deployed, and whether evasive maneuvering was attempted as determined by the route of the vehicle prior to the event. As will be understood by those skilled in the art, metadata 180 may include an extremely rich variety of information limited only by the scope and type of information obtained prior to, during, and after an event.

Figure 4:
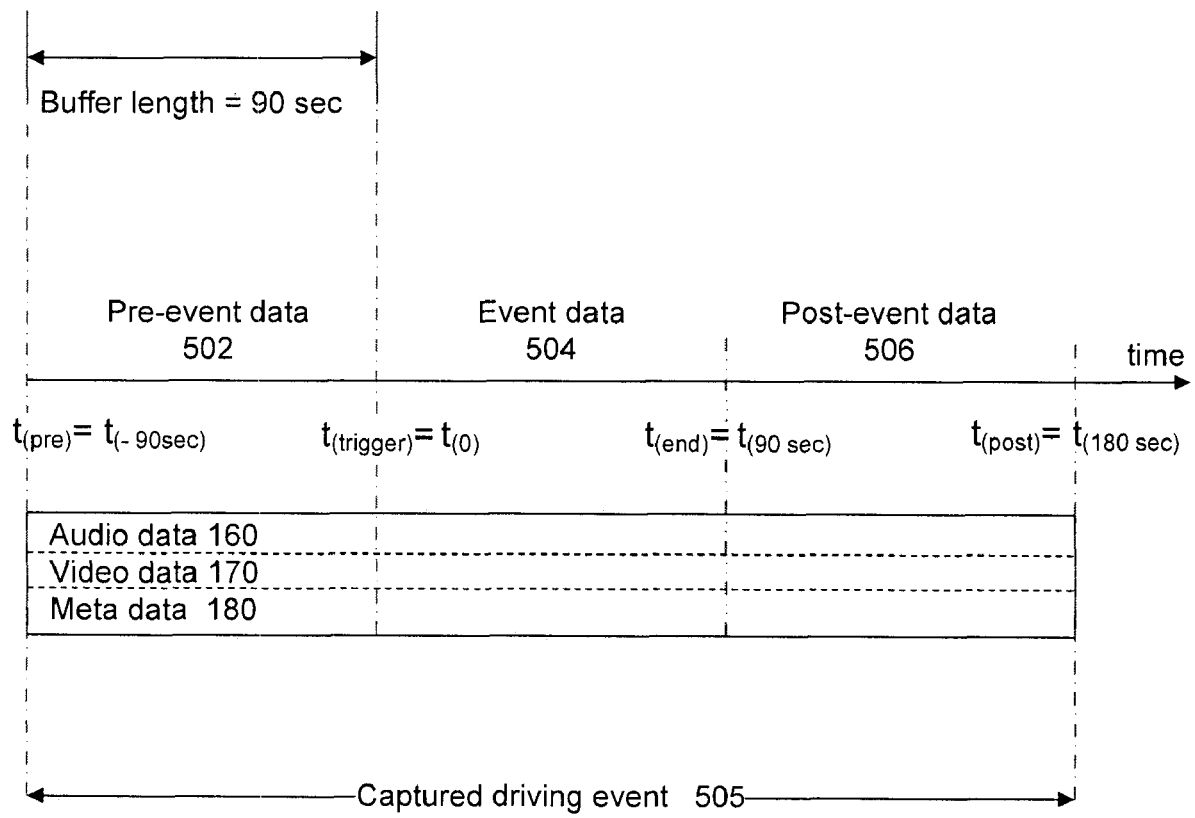
FIG. 4 is a block diagram illustrating an example of captured driving event data according to an embodiment of the present invention.

FIG. 4 is a block diagram illustrating an example of captured driving event data or driving event record 505 according to an embodiment of the present invention. In the illustrated embodiment, the captured event data 505 comprises audio data 160, video data 170, and metadata 180.

In one embodiment, the event detector receives buffers of the captured event data 505. The length of a buffer may vary. In the illustrated embodiment, the buffer can capture ninety seconds of data.

The captured event data 505 may comprise three data segments: pre-event data 502, event data 504 and post-event data 506. Although the three data segments are the same length in the illustrated embodiment, they may be of different lengths in other embodiments. The pre-event data 502 comprises the data captured just before the driving event was triggered. The event data 504 comprises the driving event data captured from the beginning of the event to the end of the event. The post-event data 506 comprises the data captured after the driving event ended.

In one embodiment, the event detector is configured to create metadata tags, and use those tags to index the beginning and the end of the pre-event data, event data and post-event data. For example, the beginning of the pre-event data can be indexed with a pre-event time tag set to the beginning of the pre-event data, whereas the end of the pre-event data can be indexed with a trigger time tag set to the end of the pre-event data. Similarly, the beginning of the event data can be indexed with the trigger time tag set to the beginning of the event data, whereas the end of the event data can be indexed with an end time tag set to the end of the event data. Correspondingly, the beginning of a post-event data can be indexed with the end time tag set to the beginning of the event data, whereas the end of the post-event data can be indexed with a post-event time tag set to the end of the post-event data.

In one embodiment, the event detector is configured to concatenate a number of data buffers. For example, the event detector can concatenate pre-event data with event data and with post-event data.

In the embodiment illustrated in FIG. 4, a captured driving event or driving event record 505 comprises three consecutive buffers of collected data. Each buffer is indexed using metadata tags and then concatenated to form the event 505. More specifically, the pre-event data 502 was collected during a period of time which started at a "pre time" (indicated as $t_{(pre)}$) and ended at the trigger time (indicated as $t_{(trigger)}$). Similarly, the event data 504 was collected during a period of time which started at the trigger time (indicated as $t_{(trigger)}$) and ended at an "end time" (indicated as $t_{(end)}$). Correspondingly, the post-event data 506 was collected during a period of time which started at the end time (indicated as $t_{(end)}$) of the event data and ended at a "post time" (indicated as $t_{(post)}$). Then, the pre-event data 502 was concatenated with the event data 504 and with the event data 506.

Figure 5:
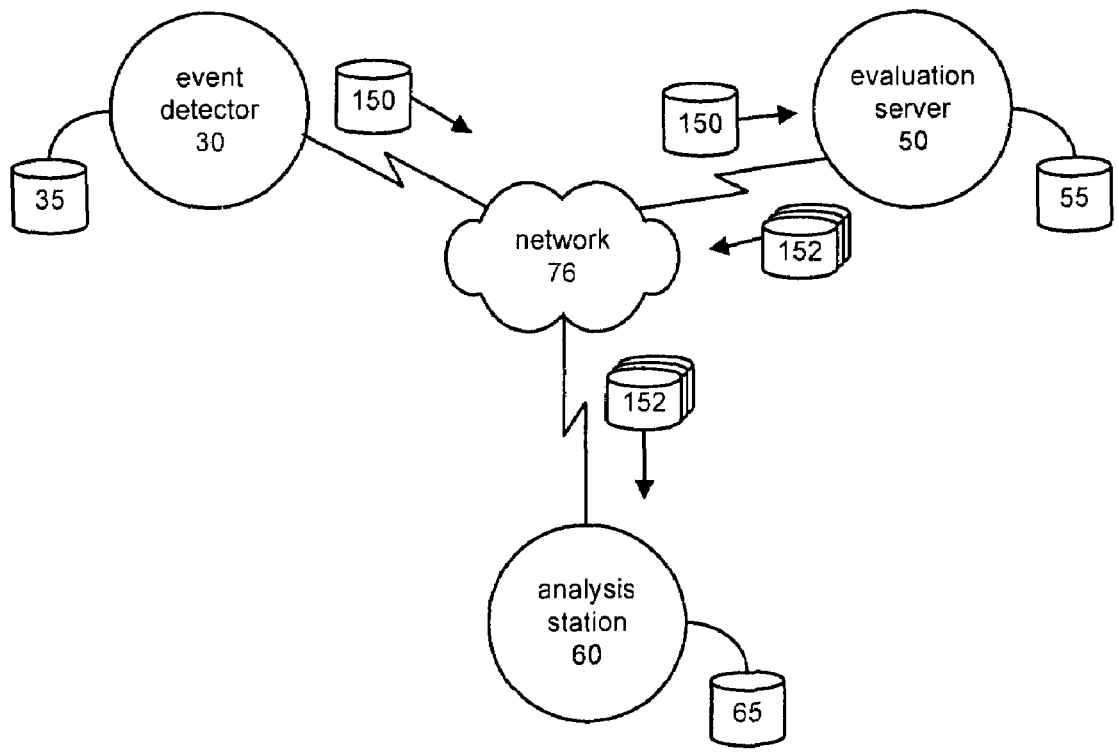
FIG. 5 is a network diagram illustrating an example system for selective reviewing of driving event data according to an embodiment of the present invention.

FIG. 5 is a network diagram illustrating an example system for selective reviewing of driving event data in communication via a network according to an embodiment of the present invention. In the illustrated embodiment, the system includes an event detector 30, an evaluation server 50, and an analysis station 60, each communicating with another via a network 76, and each coupled with a data storage area 35, 55, and 65, respectively. Additional event detectors 30, evaluation servers 50, and analysis stations 60 may also be included.

The function of the event detector 30 is to identify and capture a plurality of events and send data structures representing the audio, video, and other related data, collectively called an "event," to the evaluation server 50. The evaluation server maintains the captured events and provides them to the analysis station 60 where the events are reviewed. The analysis station 60 may be configured with certain hardware and software modules that allow an operator to review event data (e.g., audio, video, and metadata) in order to make an analysis related to the event and create summary reports and the like.

After an event is reviewed, it may be discarded, flagged for follow up, flagged for inclusion in one or more reports, or otherwise maintained for later reporting or analysis. In one embodiment; certain portions of one or more events may be incorporated into a report and then sent to the evaluation server 50 for storage.

In one embodiment, an event 150 is captured by an event detector 30 and stored until it is provided to the evaluation server 50. The means by which an event 150 can be provided to the evaluation server 50 can vary. For example, an event 150 may be provided from event detector 30 to the evaluation server 50 by way of a portable media device, a direct wire link, a direct wireless link, an indirect wire link, an indirect wireless link, or any combination of these. Event 150 may be secured by encryption of the event data structure and/or a secure channel between the event detector 30 and the evaluation server 50.

For example, a portable media device may include a USB drive, compact disc, thumb drive, media card, or other similar type of device. A direct wire link may include a USB cable, a firewire cable, an RS-232 cable, or the like. A direct wireless link may include an infrared link, a Bluetooth link, or an IEEE 802.11 point-to-point link, just to name a few. An indirect wired link may include a packet switched or circuit switched network connection configured for conveyance of data traffic. An Ethernet network connection is an example of a packet switched indirect wired link and a dial up modem connection is an example of a circuit switched indirect wired link, both of which may be configured for conveyance of data traffic.

In the illustrated embodiment, the event 150 travels over the network 76 from the event detector 30 to the evaluation server 50. The network 76 may comprise any of a variety of network types and topologies and any combination of such types and topologies. For example, the network 76 may comprise a plurality of networks including private, public, circuit switched, packet switched, personal area networks ("PAN"), local area networks ("LAN"), wide area networks ("WAN"), metropolitan area networks ("MAN"), or any combination of these. The network 76 may also include that particular combination of networks universally known as the Internet.

The event 150 may travel to the wireless network 76 by way of an access point (not shown) and then on to the evaluation server 50 via the wireless network 76 in one embodiment. The access point may provide access via many different wireless network protocols as will be well understood by those having skill in the art. The wireless network may be a WWAN or a WiFi network. The link between the event detector 30 and the access point may be a short range direct link or a wide range direct link. The access point may be a large radio tower device or a small in-home wireless appliance. The wireless network 76 may include over the air segments and also wired segments. For example, the last mile segments of wireless network may be over the air while internal and back end segments may be wired segments. In one embodiment, the wireless network 76 may provide a wireless interface to the event detector and then have a wired interface on the back end to the Internet, which in turn connects to the evaluation server 50.

In one embodiment, an event 150 may be provided from the event detector 30 to a docking station, (not shown) then to the network 76, and then to the evaluation server 50. Providing the event 150 from the event detector 30 to the docking station can be accomplished via a variety of means as described above, including portable media, direct wired or wireless link, and indirect wired or wireless link. The event detector 30 may also be physically coupled with the docking station to convey the event 150 from the event detector 30 to the docking station. Once the event 150 is received by the docking station, the event 150 is sent over the network 76 to the evaluation server 50.

The network 76 may be a wired or wireless network or a combination of the two. The network 76 may also be private or public in whole or in part and may also include the Internet.

In one embodiment, the evaluation server 50 is configured to save the event data in a data buffer, create groups of events, and concatenate data from a number of data buffers.

The event detector 30 may be configured to create metadata tags and assign them to a variety of points in one embodiment. A metadata tag correlates to a particular moment in time and can be linked to a corresponding portion of a video and/or audio buffer. For example, for a given event, one metadata tag can be assigned to the beginning of the event, and another metadata tag can be assigned to the end of the event.

In one embodiment, a group of events 152 traveling from the evaluation server 50 can be routed to the analysis station 60. The means by which the group of events 152 can be provided to the analysis station 60 can vary. In various embodiments (or in a single embodiment), the group of events 152 can be provided by the evaluation server 50 to the analysis station 60 via the network 76.

The group of events 152 may be identified, for example, by searching for all events that pertain to a particular driver. This may be accomplished by associating each event at the time it is captured with a particular driver. For example, the driver of a vehicle may have a unique identifier and that unique identifier may be included as part of the metadata for each event that is captured while that driver is operating the vehicle.

Groups of events 152 may also be identified by all events associated with a particular company, a particular shift, a particular supervisor, or other reporting structure or working structure combinations. Such a group of events 152, once provided to the analysis station 60, can then be analyzed by an operator who reviews each event and identifies those events that need to be reported or shown to the driver.

Figure 6:
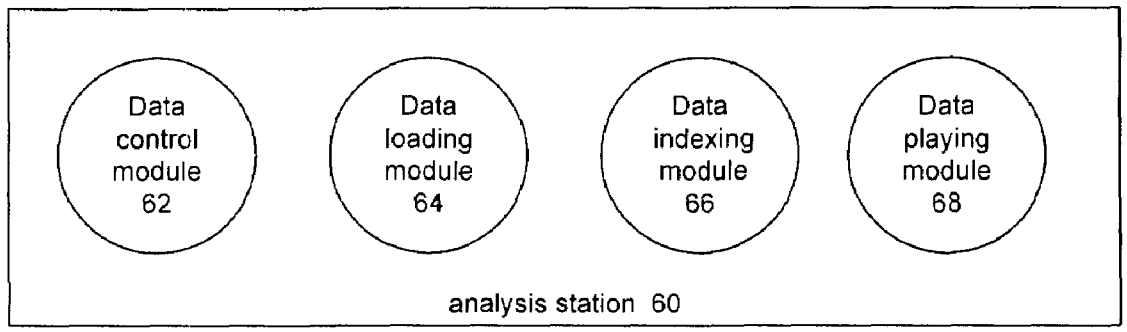
FIG. 6 is a block diagram illustrating an example analysis station according to an embodiment of the present invention.

FIG. 6 is a block diagram illustrating an example analysis station 60 according to an embodiment of the present invention. In the illustrated embodiment, the analysis station 60 includes a data control module 62, a data loading module 64, a data indexing module 66 and a data playing module 68.

The function of the data control module 62 is to receive a driving event from the evaluation server, identify a trigger time in the metadata associated with the event and send the driving event to the data loading module 64. The data loading module 64 loads the driving event data to a playing device for review.

Before the data are played, the data have to be properly cued by the data indexing module 66. The data indexing module 66 determines the cue point for the cueing of the driving event by selecting a cue interval and computing the cue point in time. As a first approximation, the data indexing module 66 presets the cue interval to a relatively small time interval, such as, e.g. 2 seconds. Then, the data indexing module 66 determines the cue point by subtracting in time the cue interval from the trigger time.

In one embodiment, the cue point is adjusted until the playing of the driving event starts at a desired point in time. The adjusting of the cue point time can be an iterative process. It can involve a repetitive adjustment of the cue interval and a repetitive recalculation of the new cue point.

The main function of the data playing module 68 is to play the event for review. The data playing module 68 plays the data from the cue point to the end of event data or until an operator stops the playing.

Figure 7A:
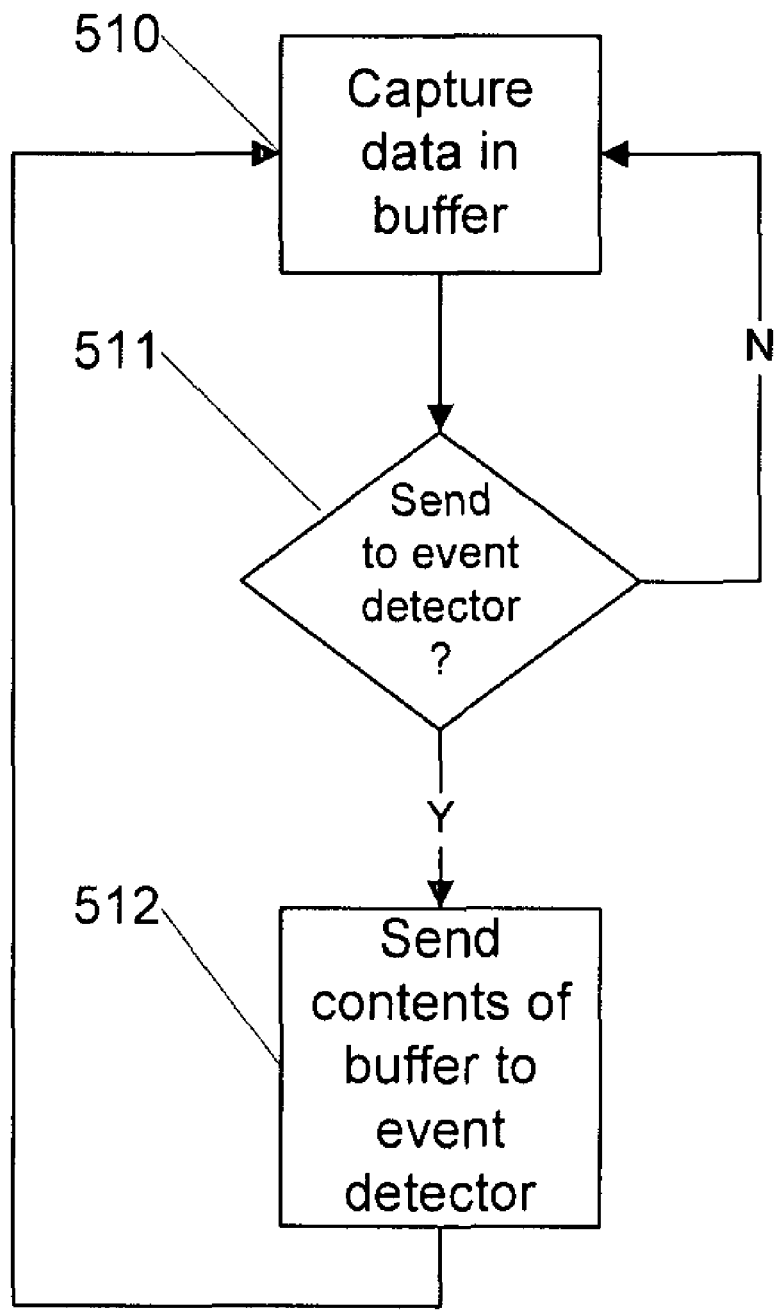
FIG. 7A is a flow diagram illustrating an example process for capturing driving data according to an embodiment of the present invention.

FIG. 7A is a flow diagram illustrating an example process for capturing driving data according to an embodiment of the present invention. In the illustrated embodiment, the event capture device continuously captures driving data, puts the data in a buffer, and sends the data to the event detector if the event detector requests that.

At a step 510, the event capture device receives data. The data is captured continuously by filling the data buffer with incoming data starting from the beginning of the buffer to the end of the buffer.

At a step 511, the event capture device monitors a trigger to find out whether the event detector requested the data. As soon as a trigger or request is received from the event detector asking the event capture device to send captured data, the event capture device sends the contents of the buffer to the event detector (step 512), and continues to send buffers of captured data to the event capture device until the event detector asks it to stop. If no trigger or request to send data is received and the buffer is full, the event capture device continues to capture data by overwriting the buffer with new data (step 510).

The length of the buffer may vary. In one embodiment, the size of the buffer allows storing of ninety seconds of video data, audio data, or meta data.

At a step 512, the event capture device sends the whole buffer of data to the event detector after receiving a request or trigger. As soon as the buffer is sent, the event capture device proceeds to overwrite the bits and bytes of the buffer with new data, in step 510, and sends the next buffer of data to the event detector unless a request to stop sending data is received.

Figure 7B:
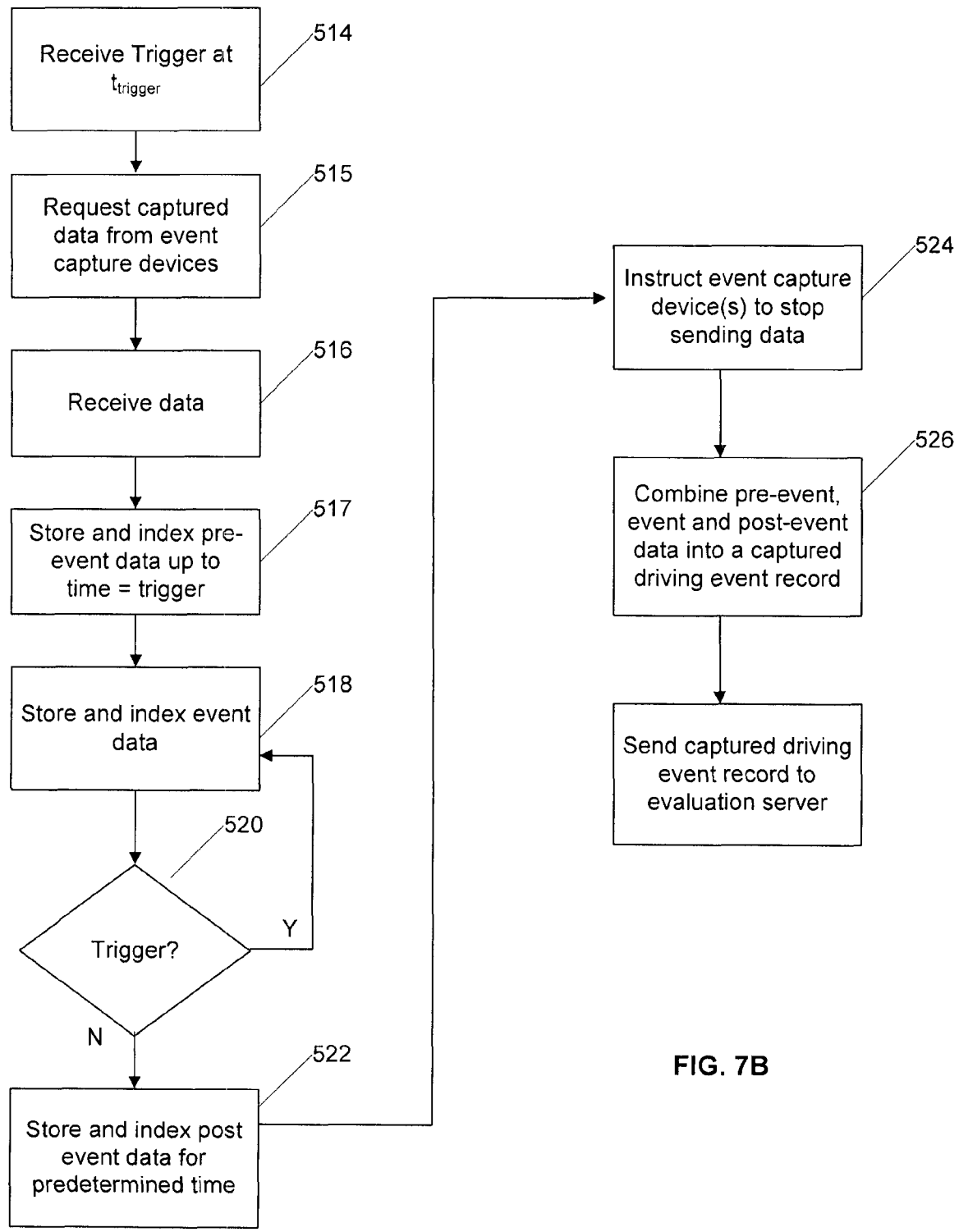
FIG. 7B is a flow diagram illustrating an example process for receiving, combining and storing driving data according to an embodiment of the present invention.

FIG. 7B is a flow diagram illustrating an example process for receiving, combining and storing driving data at an event detector according to an embodiment of the present invention. In the illustrated embodiment, once the event detector detects a driving event or receives an event trigger, the event detector requests data from at least one event capture device, receives buffers with data from the event capture device, indexes appropriate portions of data as pre-event data, during-event data and post-event data, and concatenates the portions into one event. For example, for a given driving event, the event detector can concatenate pre-event data, during-the-event data and post-event data into a single driving event. The trigger which indicates the start of a driving event which may require analysis may be based on the output of a g-force sensor, audio data, or application of a brake pedal or the like. In one embodiment, the event detector may monitor for a predetermined output or event trigger from a sensor or the like, and on receipt of this output sends a trigger or request to one or more event capture devices to send data captured in their buffers to the event detector, and stores the time of receipt of the trigger as the event trigger time.

At a step 514, the event detector receives a trigger at time $t_{trigger}$. A request is then sent to one or more event capture devices to send captured data (step 515). The captured data in the buffer includes pre-event data, i.e. the data that the event capture device had stored in the buffer prior to the trigger time.

The event detector then receives buffers of captured data from the event capture device (step 516), or several event capture devices when the event detector has instructed more than one device to send its captured data. At a step 517, the event detector stores its own buffer with pre-event data and assigns a meta tag "$t_{(pre)}$" to the beginning of the pre-event data and a meta tag "$t_{(trigger)}$" to the end of the pre-event data.

At a step 518, the event detector stores received event data (i.e. data received from the event capture devices starting at the trigger time $t_{(trigger)}$) and assigns the meta tag "$t_{(trigger)}$" to the beginning of the event data. While collecting event data, the event detector continuously monitors the trigger status (520), and continues to store event data while the trigger remains on. The trigger state changes to "off" when the driving event is over (i.e. the trigger conditions are no longer in effect, or a sensor output or end trigger indicates that the event is at an end, or a predetermined time period has expired). The actual event duration may be controlled by an ON and OFF trigger status, i.e. the event detector requests data from event capture devices when the trigger status changes to ON, and assigns an end time to the event when the trigger status changes to OFF. At this point, the event detector assigns a meta tag "$t_{(end)}$" to the end of the event data, and continues to store and receive post-event data from the or each event capture device for a predetermined time period (step 522). In step 522, the event detector stores one or more buffers with the post-event data and assigns the meta tag "$t_{(end)}$" to the beginning of the post-event data and a meta tag "$t_{(post)}$" to the end of the post-event data. When the desired amount of post event data has been received by the event detector, the event capture device is instructed to stop sending data (step 524). This may done by changing a trigger status to OFF. It will be understood that any desired pre-event and post-event time period may be selected for completing the captured driving event The data are indexed in steps 517, 518 and 522 as follows: the beginning and the end of the pre-event data are indexed by meta-tags "$t_{(pre)}$" and "$t_{(trigger)}$," the beginning and the end of the event data are indexed by meta-tags "$t_{(trigger)}$" and "$t_{(end)}$," and the beginning and the end of the post-event data are indexed by meta-tags "$t_{(end)}$" and "$t_{(post)}$."

At a step 526, the event detector combines the pre-event data, during-the-event-data and post-event data with the appropriate metadata tags into a single event record. Then, at a step 528, the event detector sends the single event record to the evaluation server. The buffers are concatenated as it was described in FIG. 4.

Figure 8:
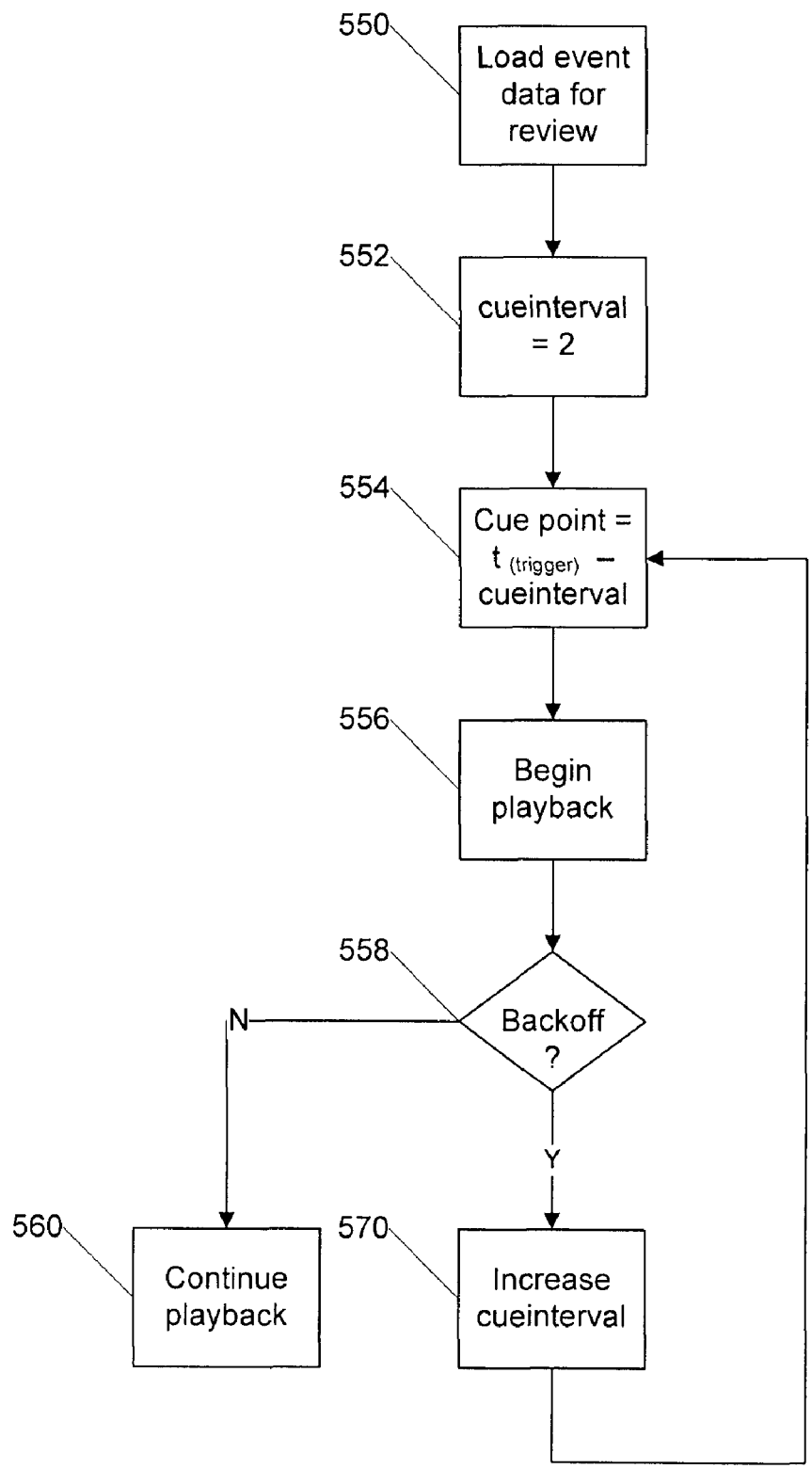
FIG. 8 is a flow diagram illustrating an example process for cueing and playing driving event data according to an embodiment of the present invention.

FIG. 8 is a flow diagram illustrating an example process for cueing and playing driving event data according to an embodiment of the present invention. In the illustrated embodiment, an analysis station loads the captured driving event data to a playing device, cues the data and plays the data for review. If necessary, the driving data may be iteratively re-cued and re-played until the review is completed.

At a step 550, the analysis station loads the captured driving event data to a playing device for review. The concatenated captured driving event data may comprise the pre-event data, during-the-event data and post-event data.

At a step 552, the analysis station sets a cue interval. The cue interval is a leading time used to determine how many seconds of pre-event data are going to be played before the playing of the during-the-event data starts. The size of the cue interval depends on the type of the driving event and the circumstances of the review. Usually, at first, the cue interval is ad hoc selected to be a small period of time, and later it is refined to a more accurate time interval. For example, the cue interval may be at first set to two seconds. If the two-second-cue interval is acceptable, the last two seconds of the pre-event data are going to be played before the playing of the event data. In an alternative embodiment, the cue interval may be set to a period of time measured in minutes, etc.

At a step 554, the analysis station determines the cue point for the playing of the captured driving event data. The cue point is computed by subtracting the cue interval from the trigger time. For example, if the cue interval is two seconds, then the cue point is set to two seconds prior to the trigger time.

At a step 556, the analysis station initiates the playing of the captured event data starting from the cue point. Then, if a reviewer requests that the data be backed off (step 558), the analysis station increases the cue interval (step 570), adjusts the cue point to reflect the new cue interval (step 554), and restarts the playback from the new cue point (step 556).

The process of adjusting the cue point and playing back is repeated until further adjustments of the cue point are unnecessary. Once that is achieved, at step 560, the playing of the captured driving event data is continued until the end of the driving event or until an operator stops the playing. For example, the operator may want to view at least part of the post-event data 506 before stopping the playback.

Figure 9:
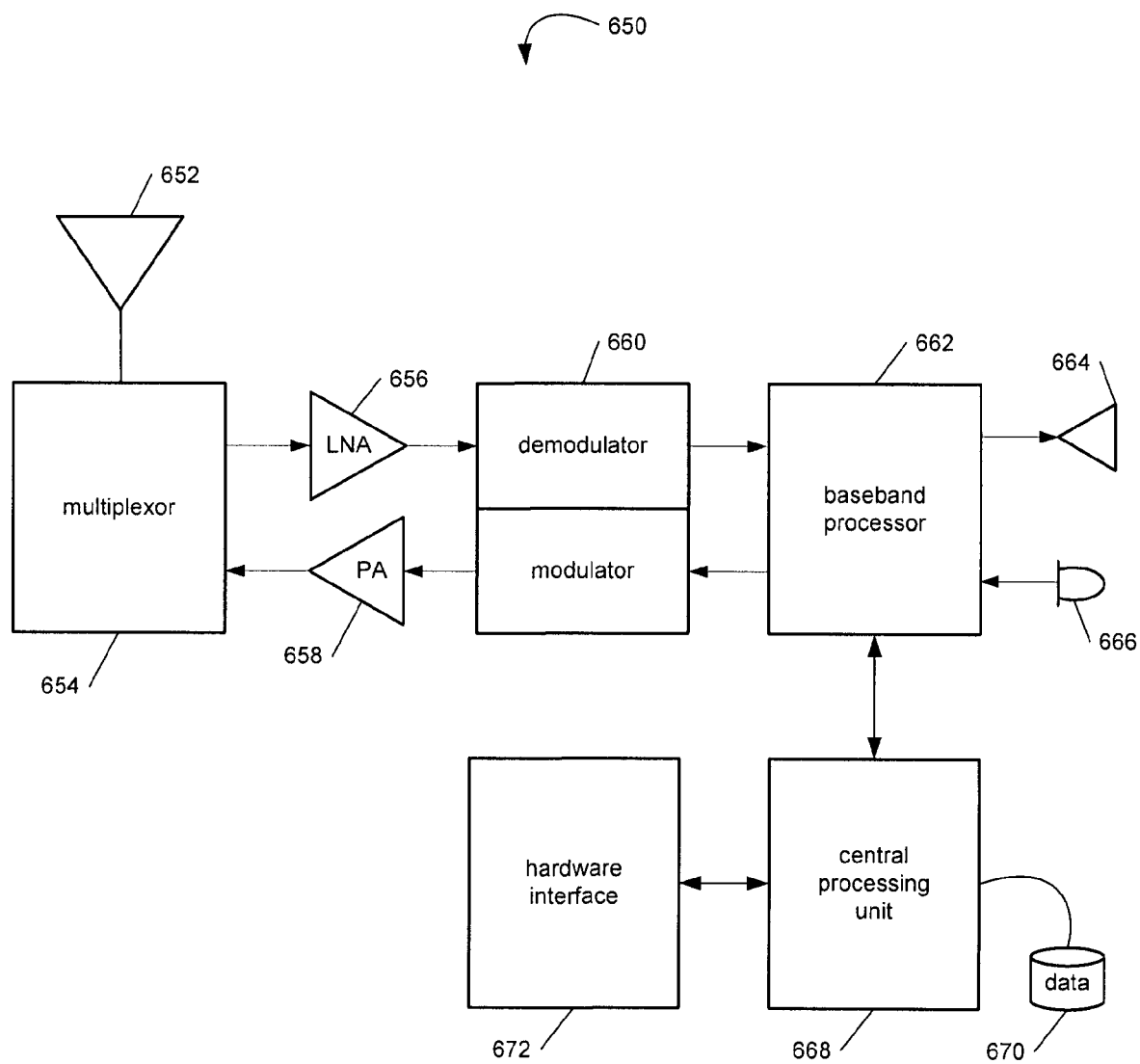
FIG. 9 is a block diagram illustrating an exemplary wireless communication device that may be used in connection with the various embodiments described herein.

FIG. 9 is a block diagram illustrating an exemplary wireless communication device 650 that may be used in connection with the various embodiments described herein. For example, the wireless communication device 650 may be used in conjunction with an event detector previously described with respect to FIGS. 1-2, or an evaluation server or an analysis station previously described with respect to FIGS. 5-6. However, other wireless communication devices and/or architectures may also be used, as will be clear to those skilled in the art.

In the illustrated embodiment, wireless communication device 650 comprises an antenna 652, a multiplexor 654, a low noise amplifier ("LNA") 656, a power amplifier ("PA") 658, a modulation circuit 660, a baseband processor 662, a speaker 664, a microphone 666, a central processing unit ("CPU") 668, a data storage area 670, and a hardware interface 672. In the wireless communication device 650, radio frequency ("RF") signals are transmitted and received by antenna 652. Multiplexor 654 acts as a switch, coupling antenna 652 between the transmit and receive signal paths. In the receive path, received RF signals are coupled from a multiplexor 654 to LNA 656. LNA 656 amplifies the received RF signal and couples the amplified signal to a demodulation portion of the modulation circuit 660.

Typically modulation circuit 660 combines a demodulator and modulator in one integrated circuit ("IC"). The demodulator and modulator can also be separate components. The demodulator strips away the RF carrier signal leaving a base-band receive audio signal, which is sent from the demodulator output to the base-band processor 662.

If the base-band receive audio signal contains audio information, then base-band processor 662 decodes the signal and converts it to an analog signal. Then the signal is amplified and sent to the speaker 664. The base-band processor 662 also receives analog audio signals from the microphone 666. These analog audio signals are converted to digital signals and encoded by the base-band processor 662. The base-band processor 662 also codes the digital signals for transmission and generates a base-band transmit audio signal that is routed to the modulator portion of modulation circuit 660. The modulator mixes the base-band transmit audio signal with an RF carrier signal generating an RF transmit signal that is routed to the power amplifier 658. The power amplifier 658 amplifies the RF transmit signal and routes it to the multiplexor 654 where the signal is switched to the antenna port for transmission by antenna 652.

The baseband processor 662 is also communicatively coupled with the central processing unit 668. The central processing unit 668 has access to a data storage area 670. The central processing unit 668 is preferably configured to execute instructions (i.e., computer programs or software) that can be stored in the data storage area 670. Computer programs can also be received from the baseband processor 662 and stored in the data storage area 670 or executed upon receipt. Such computer programs, when executed, enable the wireless communication device 650 to perform the various functions of the present invention as previously described.

In this description, the term "computer readable medium" is used to refer to any media used to provide executable instructions (e.g., software and computer programs) to the wireless communication device 650 for execution by the central processing unit 668. Examples of these media include the data storage area 670, microphone 666 (via the baseband processor 662), antenna 652 (also via the baseband processor 662), and hardware interface 672. These computer readable mediums are means for providing executable code, programming instructions, and software to the wireless communication device 650. The executable code, programming instructions, and software, when executed by the central processing unit 668, preferably cause the central processing unit 668 to perform the inventive features and functions previously described herein.

The central processing unit is also preferably configured to receive notifications from the hardware interface 672 when new devices are detected by the hardware interface. Hardware interface 672 can be a combination electromechanical detector with controlling software that communicates with the CPU 668 and interacts with new devices.

Figure 10:
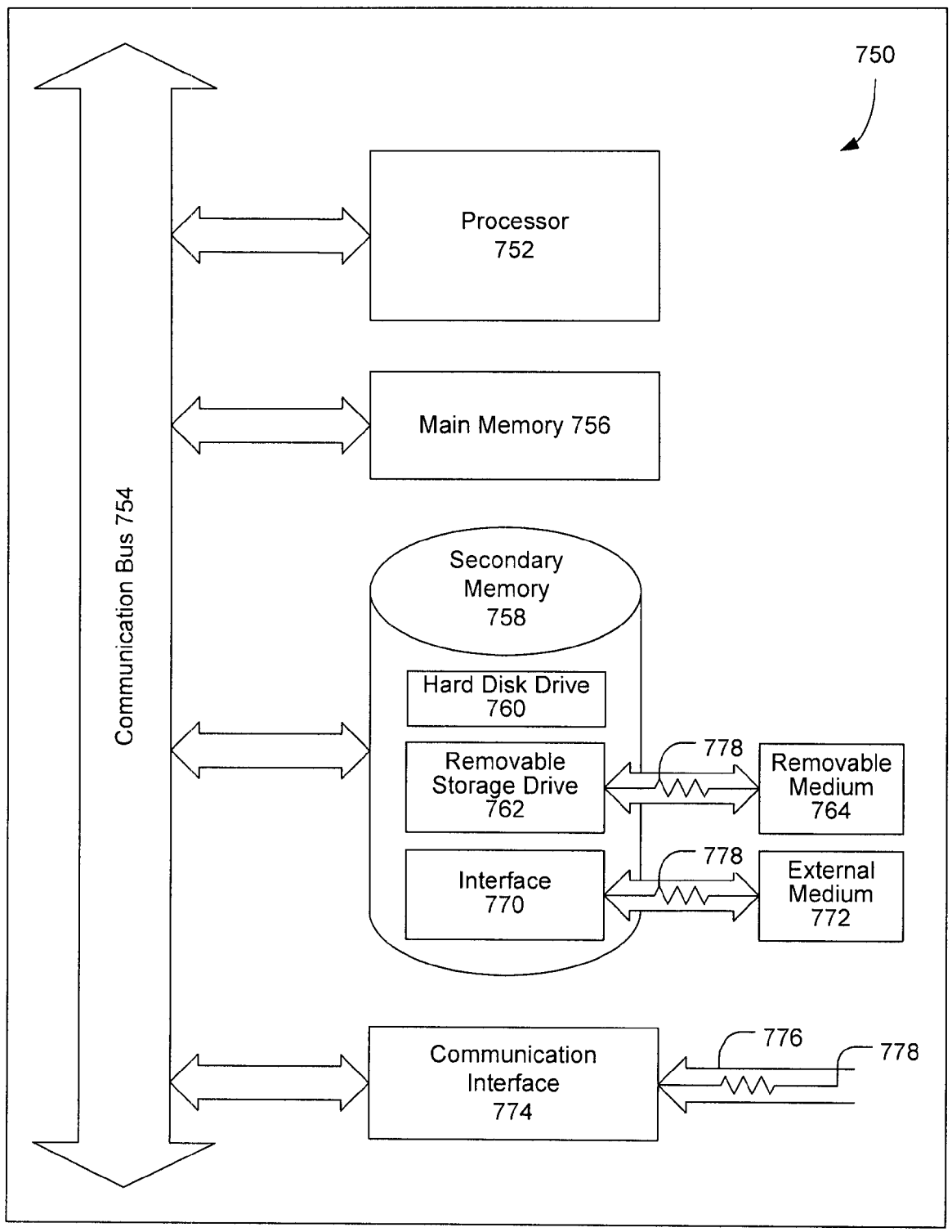
FIG. 10 is a block diagram illustrating an exemplary computer system as may be used in connection with various embodiments described herein.

FIG. 10 is a block diagram illustrating an exemplary computer system 750 that may be used in connection with the various embodiments described herein. For example, the computer system 750 may be used in conjunction with an event detector previously described with respect to FIGS. 1-2, or an evaluation server or an analysis station previously described with respect to FIGS. 5-6. However, other computer systems and/or architectures may be used, as will be clear to those skilled in the art.

The computer system 750 preferably includes one or more processors, such as processor 752. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 752.

The processor 752 is preferably connected to a communication bus 754. The communication bus 754 may include a data channel for facilitating information transfer between storage and other peripheral components of the computer system 750. The communication bus 754 further may provide a set of signals used for communication with the processor 752, including a data bus, address bus, and control bus (not shown). The communication bus 754 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

Computer system 750 preferably includes a main memory 756 and may also include a secondary memory 758. The main memory 756 provides storage of instructions and data for programs executing on the processor 752. The main memory 756 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 758 may optionally include a hard disk drive 760 and/or a removable storage drive 762, for example a floppy disk drive, a magnetic tape drive, a compact disc ("CD") drive, a digital versatile disc ("DVD") drive, etc. The removable storage drive 762 reads from and/or writes to a removable storage medium 764 in a well-known manner. Removable storage medium 764 may be, for example, a floppy disk, magnetic tape, CD, DVD, etc.

The removable storage medium 764 is preferably a computer readable medium having stored thereon computer executable code (i.e., software) and/or data. The computer software or data stored on the removable storage medium 764 is read into the computer system 750 as electrical communication signals 778.

In alternative embodiments, secondary memory 758 may include other similar means for allowing computer programs or other data or instructions to be loaded into the computer system 750. Such means may include, for example, an external storage medium 772 and an interface 770. Examples of external storage medium 772 may include an external hard disk drive or an external optical drive, or an external magneto-optical drive.

Other examples of secondary memory 758 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units 772 and interfaces 770, which allow software and data to be transferred from the removable storage unit 772 to the computer system 750.

Computer system 750 may also include a communication interface 774. The communication interface 774 allows software and data to be transferred between computer system 750 and external devices (e.g. printers), networks, or information sources. For example, computer software or executable code may be transferred to computer system 750 from a network server via communication interface 774. Examples of communication interface 774 include a modem, a network interface card ("NIC"), a communications port, a PCMCIA slot and card, an infrared interface, and an IEEE 1394 fire-wire, just to name a few.

Communication interface 774 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 774 are generally in the form of electrical communication signals 778. These signals 778 are preferably provided to communication interface 774 via a communication channel 776. Communication channel 776 carries signals 778 and can be implemented using a variety of wired or wireless communication means including wire or cable, fiber optics, conventional phone line, cellular phone link, wireless data communication link, radio frequency (RF) link, or infrared link, just to name a few.

Computer executable code (i.e., computer programs or software) is stored in the main memory 756 and/or the secondary memory 758. Computer programs can also be received via communication interface 774 and stored in the main memory 756 and/or the secondary memory 758. Such computer programs, when executed, enable the computer system 750 to perform the various functions of the present invention as previously described.

In this description, the term "computer readable medium" is used to refer to any media used to provide computer executable code (e.g., software and computer programs) to the computer system 750. Examples of these media include main memory 756, secondary memory 758 (including hard disk drive 760, removable storage medium 764, and external storage medium 772), and any peripheral device communicatively coupled with communication interface 774 (including a network information server or other network device). These computer readable mediums are means for providing executable code, programming instructions, and software to the computer system 750.

In an embodiment that is implemented using software, the software may be stored on a computer readable medium and loaded into computer system 750 by way of removable storage drive 762, interface 770, or communication interface 774. In such an embodiment, the software is loaded into the computer system 750 in the form of electrical communication signals 778. The software, when executed by the processor 752, preferably causes the processor 752 to perform the inventive features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such that the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

The invention claimed is:

1. A system for selective reviewing of driving event data, comprising: an event detector coupled with a vehicle, configured to capture and store driving events, each said captured and stored driving event having a pre-event time, a trigger time and a post-event time; an evaluation server configured to receive and store a plurality of said driving events from the event detector and provide said driving events for analysis; and an analysis station comprising a data loading module, a data indexing module, a data control module, and a data playing module, wherein the data loading module is configured to receive the captured driving event from the evaluation server and load the captured driving event for review, the data indexing module is configured to cue up the captured driving event at a selected cue time that is prior to the trigger time, and to adjust the cue time within the range between the pre-event time and the trigger time, and the data playing module is configured to play the cued up driving event from the cue time to the post-event time.

2. The system of claim 1, wherein the data control module is configured to stop the playing of the cued up driving event, request an adjustment of the cue time, and request the playing of the driving event from a new cue time.

3. The system of claim 1, wherein the captured driving event comprises information collected from inside the vehicle.

4. The system method of claim 1, wherein the captured driving event comprises information collected from outside the vehicle.

5. The system of claim 1, wherein the captured driving event comprises information from an internal vehicle bus about the baseline noise level of the operating vehicle.

6. The system of claim 1, wherein the captured driving event comprises video data.

7. The system of claim 6, wherein the video data comprises stilt images.

8. The system of claim 6, wherein the video data comprises moving images.

9. The system of claim 1, wherein the captured driving event comprises audio data.

10. The system of claim 1, wherein the captured driving event comprises metadata.

11. The system of claim 1, wherein the event detector further comprises at least one event capture device for capturing driving events.

12. The system of claim 11, wherein the event capture device comprises a video camera.

13. The system of claim 11, wherein the event capture device comprises a still camera.

14. The system of claim 11, wherein the event capture device comprises a microphone.

15. The system of claim 1, further comprising a plurality of event capture devices communicatively coupled with the event detector and configured to capture and store driving event data, the event detector being configured to receive captured data from selected event capture devices on detection of a driving event.

16. The system of claim 15, wherein the event capture devices are selected from a group consisting of: image capture devices, audio data capture devices, and meta data capture devices.

17. The system of claim 15, wherein the event capture devices comprise at least a video camera, an audio data capture device, and a meta data capture device.

18. A method for selective reviewing of driving event data, comprising: capturing and indexing a driving event at an event detector, wherein the event detector is coupled with a vehicle, and wherein the captured driving event has a trigger time; sending the captured driving event from the event detector to an evaluation sewer; receiving and storing a plurality of said driving events at the evaluation server; sending the captured driving event from the evaluation server to an analysis station; receiving the captured driving event at the analysis station and loading the captured driving event for review; cueing up the captured driving event at a cue time set prior to the trigger time; and playing the cued up driving event from the cue time, further comprising adjusting the cue time within the range between a pre-event time and the trigger time, and playing the captured event from a new cue time.

19. The method of claim 18, wherein capturing and indexing a driving event comprises capturing and indexing information collected from inside the vehicle.

20. The method of claim 18, wherein capturing and indexing a driving event comprises capturing and indexing information collected from outside the vehicle.

21. The method of claim 18, wherein capturing and indexing a driving event comprises capturing and indexing information collected from an internal vehicle bus about the baseline noise level of the operating vehicle.

22. The method of claim 18, wherein capturing and indexing a driving event comprises capturing and indexing still images.

23. The method of claim 18, wherein capturing and indexing a driving event comprises capturing and indexing moving images.

24. The method of claim 18, wherein capturing and indexing a driving event comprises capturing and indexing metadata.

25. The method of claim 18, wherein capturing and indexing a driving event comprises capturing and indexing audio data.

26. The method of claim 18, wherein capturing and indexing a driving event comprises capturing and indexing data from at least one event capture device.

27. The method of claim 26, wherein capturing and indexing a driving event comprises capturing and indexing data from a plurality of event capture devices.

28. The method of claim 27, wherein capturing and indexing a driving event comprises capturing and indexing data from at least an image recording device, a microphone, and a meta data capture device.

29. The method of claim 18, wherein the event detector indexes the captured driving event with an event trigger time, a selected pre-event start time prior to the trigger time, an event end time, and a post-event end time at a predetermined time interval after the event end time, and the captured driving event comprises pre-event data from the pre-event start time to the trigger time, event data from the trigger time to the event end time, and post-event data from the event end time to the post-event end time.

30. The method of claim 29, wherein the cue time is at a selected time between the pre-event start time and the trigger time.

31. The method of claim 29, wherein the event detector further indexes the captured driving event with a post-event time, and the post-event time is a selected time between the event end time and the post-event end time.

32. The method of claim 18, wherein capturing and indexing a driving event further comprises the steps of: capturing data in buffers; detecting an event start trigger; identifying buffered data received prior to the event start trigger as pre-event data; identifying buffered data received from the event start trigger until detection of an event end trigger as event data; detecting the event end trigger; and identifying buffered data received after the event end trigger as post-event data.

33. The method of claim 32, wherein capturing and indexing a driving event further comprises the step of: combining the pr-event data, event data, and post-event data into a single diving event record.

* * * * *

(12) INTER PARTES REEXAMINATION CERTIFICATE (558th)
United States Patent
Etcheson

(10) Number: US 7,804,426 C1
(45) Certificate Issued: Mar. 18, 2013

(54) SYSTEM AND METHOD FOR SELECTIVE REVIEW OF EVENT DATA

(75) Inventor: Jamie Etcheson, El Cajon, CA (US)

(73) Assignee: Leader Ventures, LLC, San Francisco, CA (US)

Reexamination Request:
No. 95/001,781, Oct. 11, 2011
No. 95/001,802, Nov. 3, 2011

Reexamination Certificate for:
Patent No.: 7,804,426
Issued: Sep. 28, 2010
Appl. No.: 11/566,424
Filed: Dec. 4, 2006

Related U.S. Application Data

(63) Continuation-in-part of application No. 11/382,328, filed on May 9, 2006, now abandoned, and a continuation-in-part of application No. 11/382,325, filed on May 9, 2006, and a continuation-in-part of application No. 11/382,239, filed on May 8, 2006, now Pat. No. 8,314,708, and a continuation-in-part of application No. 11/382,222, filed on May 8, 2008, now Pat. No. 7,659,827.

(51) Int. Cl.
*G08G 1/017* (2006.01)

(52) U.S. Cl. .......... 340/937; 348/148; 701/35; 340/439; 340/576; 702/188; 709/219; 725/86; 725/91; 725/93; 725/94; 725/143; 725/144; 725/145; 725/146

(58) Field of Classification Search ........................ None
See application file for complete search history.

(56) References Cited

To view the complete listing of prior art documents cited during the proceedings for Reexamination Control Numbers 95/001,781 and 95/001,802, please refer to the USPTO's public Patent Application Information Retrieval (PAIR) system under the Display References tab.

*Primary Examiner* — Jalatee Worjloh

(57) ABSTRACT

Systems and methods for computer assisted cueing and selective reviewing of driving data in order to save time in the data review process are provided. The method allows identifying essential portions of the data, selecting the essential portions, reviewing the selected data and retrieving additional data leading to the event if necessary. At least one event capture device continuously captures data into a buffer. The data are sent to an event detector communicatively coupled to the event capture device only when the event detector requests them. After receiving the data, the event detector selects and indexes a pre-event portion, during-event portion and post-event portion, combines the portions of captured data into a single driving event record and sends the driving event record to the evaluation server. From the server, the driving event record is sent to the analysis station for review and analysis.

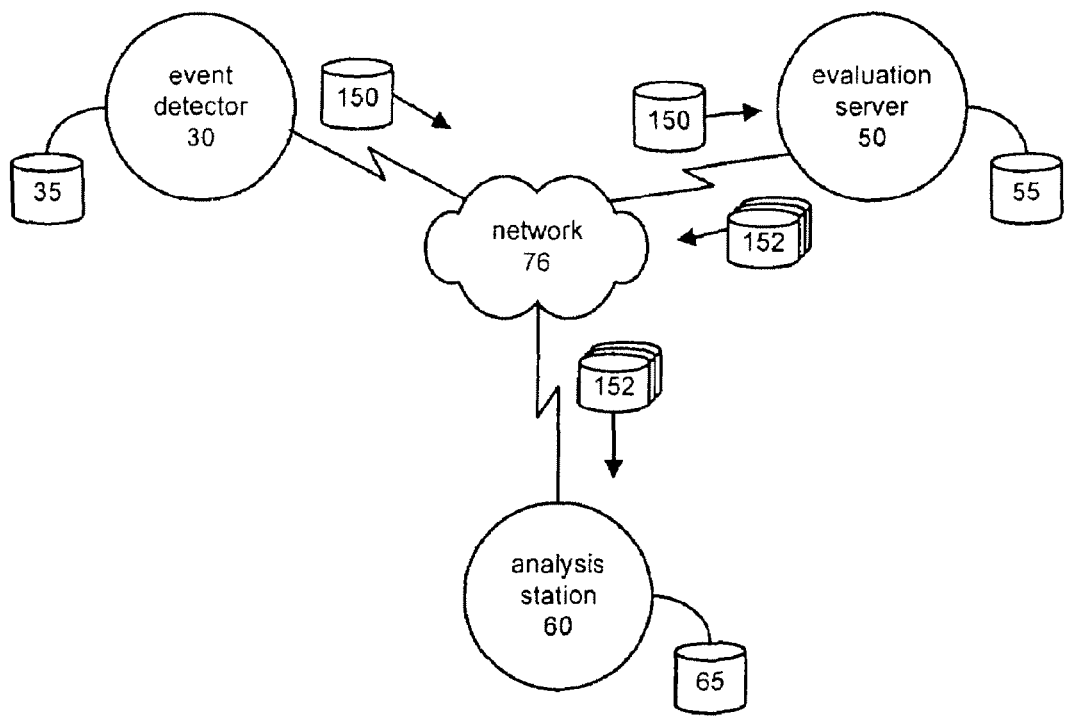

US 7,804,426 C1

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-33 is confirmed.

New claims 34-85 are added and determined to be patentable.

*34. The system of claim 1, wherein the analysis station is configured to provide a report generated at least in part by using the analysis station.*

*35. The system of claim 34, wherein a portion of the captured driving event is incorporated in the report.*

*36. The system of claim 34, wherein the analysis station is configured to provide the report to the evaluation server for storage.*

*37. The system of claim 1, wherein the cue time is set to be at a start point in time for a portion of the captured driving event to be played for analysis, and wherein certain portions of the captured driving event are incorporated into a report.*

*38. The system of claim 1, wherein the cue time is determined to be prior to the trigger time.*

*39. The system of claim 1, wherein the data indexing module is configured to adjust the cue time within the range between the pre-event time and the trigger time such that the interval between the adjusted cue time and the trigger time includes essential data from the captured driving event that precedes the trigger time, and wherein the essential data comprises data that is not skipped during a review.*

*40. The system of claim 1, wherein the data indexing module is configured to adjust the cue time within the range between the pre-event time and the trigger time such that the interval between the adjusted cue time and the trigger time excludes non-essential data from the captured driving event that precedes the trigger time, and wherein the non-essential data comprises data that is pre-event data that is skipped during a review.*

*41. The system of claim 1, wherein the data indexing module is configured to adjust the cue time within the range between the pre-event time and the trigger time to indicate a portion of the captured driving event to be shown to a driver.*

*42. The system of claim 1, wherein the interval between the selected cue time and the trigger time is based at least in part on a type of the captured driving event.*

*43. The system of claim 1, wherein the interval between the selected cue time and the trigger time is based at least in part on a circumstance of reviewing the captured driving event.*

*44. The system of claim 1, wherein the event detector is configured to concatenate a plurality of data buffers.*

*45. The system of claim 44, wherein the event detector is configured to concatenate data of the captured driving event.*

*46. The system of claim 1, wherein the analysis station is configured to receive a group of driving events from the evaluation server.*

*47. The system of claim 46, wherein the analysis station is configured to provide the group of driving events to an operator for identification of any number of events in the group of driving events that need to be reported.*

*48. The system of claim 46, wherein the analysis station is configured to provide the group of driving events to an operator for identification of any number of events in the group of driving events that need to be shown to a driver.*

*49. The system of claim 46, wherein the group pertains to a particular driver.*

*50. The system of claim 46, wherein the group pertains to a particular company.*

*51. The system of claim 46, wherein the group pertains to a particular supervisor.*

*52. The system of claim 46, wherein the group pertains to a particular shift.*

*53. The system of claim 46, wherein the group pertains to a particular reporting structure.*

*54. The system of claim 46, wherein the group is based at least in part on a search for events that pertain to a particular driver.*

*55. The system of claim 46, wherein the group is based at least in part on a search for events that pertain to a particular company.*

*56. The system of claim 46, wherein the group is based at least in part on a search for events that pertain to a particular supervisor.*

*57. The system of claim 46, wherein the group is based at least in part on a search for events that pertain to a particular shift.*

*58. The system of claim 46, wherein the group is based at least in part on a search for events that pertain to a particular reporting structure.*

*59. The system of claim 1, wherein the cue time is selected by subtracting a cue interval from the trigger time and the cue time is adjusted by increasing the cue interval.*

*60. The method of claim 18, further comprising providing a report generated at least in part by using the analysis station.*

*61. The method of claim 60, wherein a portion of the captured driving event is incorporated in the report.*

*62. The method of claim 60, wherein providing the report includes providing the report to the evaluation server for storage.*

*63. The method of claim 18, wherein the cue time is set to be at a start point in time for a portion of the captured driving event to be played for analysis, and wherein certain portions of the captured driving event are incorporated into a report.*

*64. The method of claim 18, wherein the cue time is determined to be prior to the trigger time.*

*65. The method of claim 18, wherein adjusting the cue time includes adjusting the cue time such that the interval between the adjusted cue time and the trigger time includes essential data from the captured driving event that precedes the trigger time.*

*66. The method of claim 18, wherein adjusting the cue time includes adjusting the cue time such that the interval between the adjusted cue time and the trigger time excludes non-essential data from the captured driving event that precedes the trigger time.*

*67. The method of claim 18, wherein adjusting the cue time includes adjusting the cue time to indicate a portion of the captured driving event to be shown to a driver.*

*68. The method of claim 18, wherein the interval between the cue time set prior to the trigger time and the trigger time is based at least in part on a type of the captured driving event.*

69. The method of claim 18, wherein the interval between the cue time set prior to the trigger time and the trigger time is based at least in part on a circumstance of reviewing the captured driving event.

70. The method of claim 18, wherein the event detector is configured to concatenate a plurality of data buffers.

71. The method of claim 70, wherein the event detector is configured to concatenate data of the captured driving event.

72. The method of claim 18, wherein the analysis station is configured to receive a group of driving events from the evaluation server.

73. The method of claim 72, wherein the analysis station is configured to provide the group of driving events to an operator for identification of any number of events in the group of driving events that need to be reported.

74. The method of claim 72, wherein the analysis station is configured to provide the group of driving events to an operator for identification of any number of events in the group of driving events that need to be shown to a driver.

75. The method of claim 72, wherein the group pertains to a particular driver.

76. The method of claim 72, wherein the group pertains to a particular company.

77. The method of claim 72, wherein the group pertains to a particular supervisor.

78. The method of claim 72, wherein the group pertains to a particular shift.

79. The method of claim 72, wherein the group pertains to a particular reporting structure.

80. The method of claim 72, wherein the group is based at least in part on a search for events that pertain to a particular driver.

81. The method of claim 72, wherein the group is based at least in part on a search for events that pertain to a particular company.

82. The method of claim 72, wherein the group is based at least in part on a search for events that pertain to a particular supervisor.

83. The method of claim 72, wherein the group is based at least in part on a search for events that pertain to a particular shift.

84. The method of claim 72, wherein the group is based at least in part on a search for events that pertain to a particular reporting structure.

85. The method of claim 18, wherein the cue time is set prior to the trigger time by subtracting a cue interval from the trigger time and the cue time is adjusted by increasing the cue interval.

\* \* \* \* \*